April 14, 1925.

W. C. BABIN 1,533,362

ROTARY SLIP

Filed March 17, 1924

Whitney C. Babin, Inventor

By Hardway Cuthey

Attorneys

Patented Apr. 14, 1925.

1,533,362

UNITED STATES PATENT OFFICE.

WHITNEY C. BABIN, OF BEAUMONT, TEXAS.

ROTARY SLIP.

Application filed March 17, 1924. Serial No. 699,959.

*To all whom it may concern:*

Be it known that I, WHITNEY C. BABIN, a citizen of the United States, residing at Beaumont, in the county of Jefferson and State of Texas, have invented certain new and useful Improvements in a Rotary Slip, of which the following is a specification.

This invention relates to new and useful improvements in a rotary slip.

One object of the invention is to provide a sectional rotary slip, adapted to be inserted in the opening of the rotary table around the pipe and designed to engage with the pipe to hold the same suspended in the bore.

Another object of the invention is to provide a slip formed of independent sections, each section being composed of a plurality of jaws which have a certain amount of vertical, as well as radial, movement relative to each other so that the slip will conform to the contour of, and grip, either round or irregular pipe.

With the above and other objects in view, this invention has particular relation to certain novel features of construction, operation, and arrangement of parts, an example of which is given in this specification and illustrated in the accompanying drawings, wherein.

Figure 1:
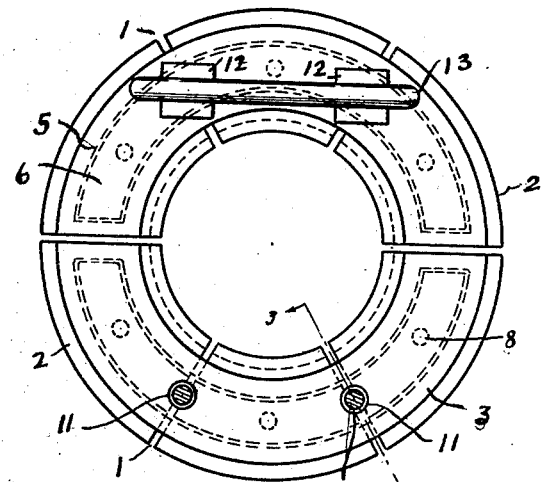
Figure 1 shows a plan view of the slip, partly in section.
Figure 3:
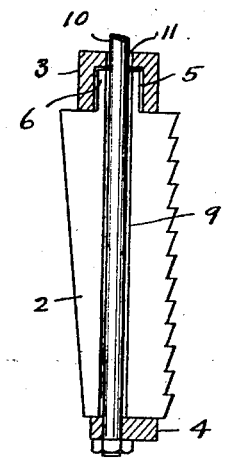
Figure 3 shows a side view of one of the slip jaws, showing the cage in section, on the line 3—3 of Figure 1.
Figure 2:
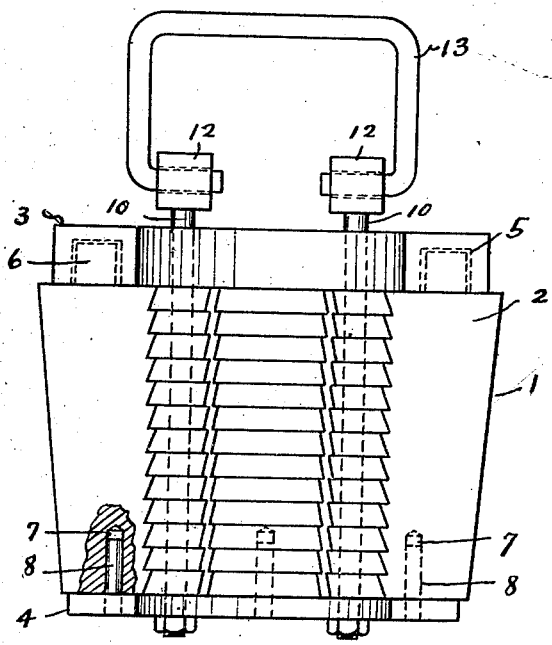
Figure 2 shows a side elevation thereof partly in section.

In the drawings, the numerals 1, 1 designate the sections as a whole. Each section includes a plurality of jaws, 2, preferably three jaws for each section. The inner side of each jaw is toothed, to engage with the pipe, and the outer sides of the jaws taper, or converge, downwardly, to conform to the shape of, and fit within, the rotary table opening. The jaws of each section are held in a cage composed of the arcuate upper and lower plates 3 and 4. The upper plate has an arcuate groove 5, in its under side, into which the tenons 6, formed on the upper ends of the jaws, fit loosely, and the lower ends of the jaws fit against the upper side of the plate 4, and are provided with deep sockets 7, into which the studs 8, upstanding from the plate 4, fit loosely.

These studs hold the lower ends of the jaws in place and yet permit the independent vertical movement of said jaws. This vertical movement is necessary for the reason that when irregular pipe is held suspended by the slips, some of the jaws will move downwardly with the pipe further than other jaws, and in order to hold irregular pipe an independent movement of the jaws, between the upper and lower plates is necessary.

The adjacent sides of the jaws of each section have vertical coinciding grooves 9, 9, forming bearings for the vertical rods 10, 10. The lower ends of these rods are fastened to the plate 4 and they extend up through said bearings, and loosely through aligned bearings 11, 11, in the upper plate 3, and the upper ends of the rods 10 are formed with enlarged heads 12, 12, spaced above the upper plate 3. U-shaped grips, or handles 13 are provided whose ends are overturned and fitted through transverse bearings through said heads, thus providing means through which the slip sections may be handled independently.

What I claim is:—

1. A rotary slip formed of independent sections, each section including a cage composed of an arcuate upper member formed with a bearing, and a lower arcuate member, a rod anchored to the lower member and fitted loosely through said bearing and forming means for handling said section, a plurality of pipe engaging jaws mounted between said members.

2. A rotary slip formed of independent sections, each section including a cage composed of an arcuate upper member formed with a bearing, and a lower arcuate member, a rod anchored to the lower member and fitted loosely through said bearing, a plurality of pipe engaging jaws mounted between said members, and a handle attached to the upper end of said rod through which the slip section may be moved as a unit.

3. A rotary slip formed of independent sections, each section including a cage composed of an arcuate upper member formed with a bearing, and a lower arcuate member, a rod anchored to the lower member and fitted loosely through said bearing, a plurality of pipe engaging jaws mounted between said members, the upper end of the rod being formed with an enlarged head, and a handle attached to the upper end of the rod through which the slip section may be moved as a unit.

4. A rotary slip formed of independent sections, each section including a cage composed of an arcuate upper member formed with a bearing, and a lower arcuate member, a rod anchored to the lower member and fitted loosely through said bearing and forming means for moving the slip section as a unit, a plurality of pipe engaging jaws mounted between said members, the lower ends of the jaws being formed with sockets, and studs carried by the lower member and projecting into said sockets.

5. A rotary slip formed of a plurality of sections, each section including an upper and a lower arcuate plate, the upper plate having bearings, a plurality of jaws between the plates, rods attached to the lower plate and passing loosely through said bearings, said rods forming means for holding said plates in position and for moving each section as a unit.

6. A rotary slip formed of a plurality of sections, each section including an upper and a lower arcuate plate, the upper plate having bearings, a plurality of jaws between the plates, rods attached to the lower plate and passing loosely through said bearings and maintaining the upper and lower plates in alignment, the lower ends of the jaws being provided with sockets, and studs carried by the lower plate and projecting into said sockets.

7. A rotary slip formed of a plurality of sections, each section including an upper and a lower arcuate plate, the upper plate having bearings, a plurality of jaws between the plates, rods attached to the lower plate and passing loosely through said bearings and holding the plates in alignment, a handle attached to the upper ends of said rods through which the corresponding section may be moved as a unit.

8. A rotary slip formed of a plurality of sections, each section including an upper and a lower arcuate plate, the upper plate having bearings, a plurality of jaws between the plates, rods attached to the lower plate and passing loosely through said bearings and holding the plates in alignment, an enlarged head carried by the upper end of each rod and spaced above the upper plate, to limit the movement of said plates from each other and a handle attached to the upper ends of the rods.

9. A rotary slip formed of a plurality of sections, each section including an arcuate upper plate having a bearing and an arcuate groove on its under side, an arcuate lower plate, a plurality of jaws between the plates, tenons formed on the upper ends of the jaws and fitting loosely in said groove, a rod attached to the lower plate, and fitting loosely through said bearing in the upper plate and forming a handle anchor, and a handle attached to the upper end of the rod through which the slip section may be moved as a unit.

10. A rotary slip formed of a plurality of sections, each section including an arcuate upper plate having a bearing and an arcuate groove on its under side, an arcuate lower plate, a plurality of jaws between the plates, tenons formed on the upper ends of the jaws and fitting loosely in said groove, a rod attached to the lower plate, and fitting loosely through said bearing in the upper plate, an enlarged head on the rod spaced above the upper plate and provided to limit the upward movement of the upper plate, and a handle attached to the upper end of the rod through which the slip section may be moved as a unit.

11. A rotary slip formed of a plurality of sections, each section including an arcuate upper plate, having a bearing and an arcuate groove on its under side, an arcuate lower plate, a plurality of jaws between the plates, tenons formed on the upper ends of the jaws and fitting loosely in said groove, a rod attached to the lower plate, and fitting loosely through said bearing in the upper plate and maintaining said plates in alignment, the lower ends of the jaws having sockets, and studs carried by the lower plate and projecting into said sockets.

In testimony whereof I have signed my name to this specification in the presence of two subscribing witnesses.

WHITNEY C. BABIN.

Witnesses:
C. R. BERRY,
J. S. JOHNSON.